United States Patent
Wu et al.

(10) Patent No.: US 11,294,252 B2
(45) Date of Patent: Apr. 5, 2022

(54) LIGHT ADJUSTING GLASS

(71) Applicants: Beijing BOE Optoelectronics Technology Co., Ltd., Beijing (CN); BOE TECHNOLOGY GROUP CO., LTD., Beijing (CN)

(72) Inventors: Xiaojuan Wu, Beijing (CN); Jian Wang, Beijing (CN); Hongliang Yuan, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/251,853

(22) PCT Filed: May 18, 2020

(86) PCT No.: PCT/CN2020/090770
§ 371 (c)(1),
(2) Date: Dec. 14, 2020

(87) PCT Pub. No.: WO2020/238670
PCT Pub. Date: Dec. 3, 2020

(65) Prior Publication Data
US 2021/0255498 A1    Aug. 19, 2021

(30) Foreign Application Priority Data

May 24, 2019    (CN) .......................... 201910442144.5

(51) Int. Cl.
*G02F 1/137*    (2006.01)
*G02F 1/1337*    (2006.01)
(Continued)

(52) U.S. Cl.
CPC ........ *G02F 1/13756* (2021.01); *G02F 1/1337* (2013.01); *G02F 1/1347* (2013.01);
(Continued)

(58) Field of Classification Search
CPC .............. G02F 1/13756; G02F 1/1337; G02F 1/134309; G02F 1/1347; G02F 2202/04; B60J 3/04
See application file for complete search history.

(56) References Cited

U.S. PATENT DOCUMENTS

| 4,874,229 A | 10/1989 | Ito et al. |
| 2016/0085108 A1* | 3/2016 | Junge .................. G02F 1/13306 349/16 |

(Continued)

FOREIGN PATENT DOCUMENTS

| CN | 106773374 A | 5/2017 |
| CN | 106842664 A | 6/2017 |

(Continued)

*Primary Examiner* — Phu Vu
(74) *Attorney, Agent, or Firm* — Houtteman Law LLC (57) ABSTRACT

The present disclosure provides a light adjusting glass, which includes at least one liquid crystal cell, each liquid crystal cell including two substrates disposed opposite to each other, and a liquid crystal layer interposed between the two substrates; where each of the substrates includes a base, an electrode layer disposed on a side of the base proximal to the liquid crystal layer; at least one electrode layer of at least one liquid crystal cell includes a plurality of electrode blocks which are disposed at intervals, and the electrode blocks are respectively controlled by separate driving circuits.

8 Claims, 4 Drawing Sheets

(51) Int. Cl.
*G02F 1/1343* (2006.01)
*G02F 1/1347* (2006.01)
*B60J 3/04* (2006.01)

(52) U.S. Cl.
CPC ........... *G02F 1/134309* (2013.01); *B60J 3/04* (2013.01); *G02F 2202/04* (2013.01)

(56) References Cited

U.S. PATENT DOCUMENTS

2018/0284521 A1* 10/2018 Kong .................... G02F 1/1337
2019/0383091 A1* 12/2019 Wilson .................... G09G 5/10

FOREIGN PATENT DOCUMENTS

| CN | 208459738 U | 2/2019 |
| CN | 210090881 U | 2/2020 |
| JP | 2019070778 A | 5/2019 |

* cited by examiner

LIGHT ADJUSTING GLASS

CROSS-REFERENCE TO RELATED APPLICATIONS

The present application claims the priority of Chinese Patent Application No. 201910442144.5, filed on May 24, 2019, the contents of which are incorporated herein in their entirety by reference.

TECHNICAL FIELD

The present disclosure relates to the technical field of intelligent glass, and in particular, relates to a light adjusting glass.

BACKGROUND

At present, light adjusting glasses are more and more widely applied in the fields of building and traffic, and the fields of automobile, high-speed train, passenger aircraft and the like are interest in the light adjusting glass with dye liquid crystal. Products such as PDLC (polymer dispersed liquid crystal) intelligent glass, electro-chromic intelligent glass and the like exist in an intelligent glass market. The PDLC intelligent glass can only realize switching between transparency and haze, and does not block light or heat; the electro-chromic intelligent glass has problems of complex film layer process, slow response speed (after 8 s to 20 s), bluish color in a dark state and the like. The light adjusting glass with dye liquid crystal realizes switching between a bright state and a dark state by utilizing a selective absorption of dichroic dye molecules in liquid crystal to light, and compared with a conventional PDLC intelligent glass and a conventional electro-chromic intelligent glass, greatly improves optical properties such as black state purity, response speed and the like. However, the existing light adjusting glass with dye liquid crystal can only realize an adjustment between a black state, a bright state and a gray level state, and can only perform a whole surface light adjusting. When the light adjusting glass is applied to the field of traffic such as trains, a same window often corresponds to different passengers, or the passenger may have different requirements on light transmittances of an upper part and a lower part of a glass, but the existing light adjusting glass cannot meet such requirements.

SUMMARY

An embodiment of the present disclosure provides a light adjusting glass, including at least one liquid crystal cell, where each liquid crystal cell includes two substrates which are disposed opposite to each other and a liquid crystal layer interposed between the two substrates, each of the substrates includes a base, and an electrode layer disposed on a side of the base proximal to the liquid crystal layer;

at least one electrode layer of at least one liquid crystal cell includes a plurality of electrode blocks disposed at intervals, and the electrode blocks are respectively controlled by separate driving circuits.

In some implementations, the at least one liquid crystal cell includes: a first liquid crystal cell and a second liquid crystal cell, the first liquid crystal cell includes a first substrate and a second substrate which are disposed opposite to each other, and a first liquid crystal layer disposed between the first substrate and the second substrate, the second liquid crystal cell includes a third substrate and a fourth substrate which are disposed opposite to each other, and a second liquid crystal layer disposed between the third substrate and the fourth substrate, and the second substrate of the first liquid crystal cell and the third substrate of the second liquid crystal cell are disposed in a laminated mode.

In some implementations, the first substrate of the first liquid crystal cell includes a first base, a first electrode layer disposed on a side of the first base proximal to the first liquid crystal layer, a first alignment layer disposed on a side of the first electrode layer proximal to the first liquid crystal layer, and the second substrate of the first liquid crystal cell includes a second base, a second electrode layer disposed on a side of the second base proximal to the first liquid crystal layer, a second alignment layer disposed on a side of the second electrode layer proximal to the first liquid crystal layer; where pretilt angles of liquid crystal molecules in the first liquid crystal layer with respect to the first alignment layer and the second alignment layer are the same;

the third substrate of the second liquid crystal cell includes a third base, a third electrode layer disposed on a side of the third base proximal to the second liquid crystal layer, and a third alignment layer disposed on a side of the third electrode layer proximal to the second liquid crystal layer, and the fourth substrate of the second liquid crystal cell includes a fourth base, a fourth electrode layer disposed on a side of the fourth base proximal to the second liquid crystal layer, and a fourth alignment layer disposed on a side of the fourth electrode layer proximal to the second liquid crystal layer; where pretilt angles of liquid crystal molecules in the second liquid crystal layer with respect to the third alignment layer and the fourth alignment layer are the same, and are different from the pretilt angles of the liquid crystal molecules in the first liquid crystal layer with respect to the first alignment layer and the second alignment layer by 90°.

In some implementations, at least one electrode layer of each liquid crystal cell includes a plurality of electrode blocks disposed at intervals; and electrode blocks of electrode layers in different liquid crystal cells are disposed in a same mode.

In some implementations, the at least one liquid crystal cell includes a plurality of liquid crystal cells, and at least one electrode layer of only one liquid crystal cell includes a plurality of electrode blocks disposed at intervals.

In some implementations, the electrode blocks of each electrode layer are disposed in an array.

In some implementations, the electrode blocks of each electrode layer are disposed side by side in a row direction or in a column direction.

In some implementations, the liquid crystal layer includes dye liquid crystal molecules.

In some implementations, the liquid crystal layer is doped with chiral additive.

In some implementations, the second base of the first liquid crystal cell is common to the third base of the second liquid crystal cell.

DESCRIPTION OF EMBODIMENTS

In order to make technical solutions of the present disclosure better understood by a person skilled in the art, the technical solutions of the present disclosure are described in further detail below with reference to the accompanying drawings and the detailed description.

An embodiment of the present disclosure provides a light adjusting glass, which includes at least one liquid crystal cell; each liquid crystal cell includes two substrates and a liquid crystal layer interposed between the two substrates; where each of the substrates includes a base and an electrode layer on a side of the base proximal to the liquid crystal layer. In the embodiment, at least one electrode layer of at least one liquid crystal cell includes: a plurality of electrode blocks disposed at intervals, and the electrode blocks are respectively controlled by separate driving circuits.

Specifically, if an electrode layer in a liquid crystal cell includes a plurality of electrode blocks, that is, the electrode blocks divide the liquid crystal cell into a plurality of areas, and the electrode blocks are respectively controlled by separate driving circuits, and thus different voltages can be applied to different electrode blocks to generate different electric fields between the different electrode blocks and the electrode layer opposite to the electrode blocks, so that liquid crystal molecules in the liquid crystal layer corresponding to the different electrode blocks are deflected by different angles, light transmittances of the liquid crystal cell in the areas corresponding to the different electrode blocks are different, that is, light transmittances of different areas of the light adjusting glass are different. Certainly, each of two electrode layers in a liquid crystal cell may include a plurality of electrode blocks, and in such case, it should be noted that the electrode blocks of one electrode layer and the electrode blocks of the other electrode layer at least partially overlap, and in above manner, the light transmittances of different areas of the light adjusting glass can also be different.

Certainly, in the embodiment, at least one of two electrode layers of each liquid crystal cell may include a plurality of electrode blocks, and the electrode blocks are respectively controlled by separate driving circuits, in such case, light transmittances of different areas of each liquid crystal cell are different, and by cooperation of liquid crystal cells, light transmittances of different areas of the light adjusting glass can be controlled more accurately.

In the embodiment, the liquid crystal layer may specifically include dye liquid crystal, i.e., including liquid crystal molecules and doped dichroic dye molecules.

In the embodiment, the liquid crystal layer may be doped with chiral additive, which can reduce the transmittance of the light adjusting glass in the dark state and increase a contrast thereof.

Figure 1:
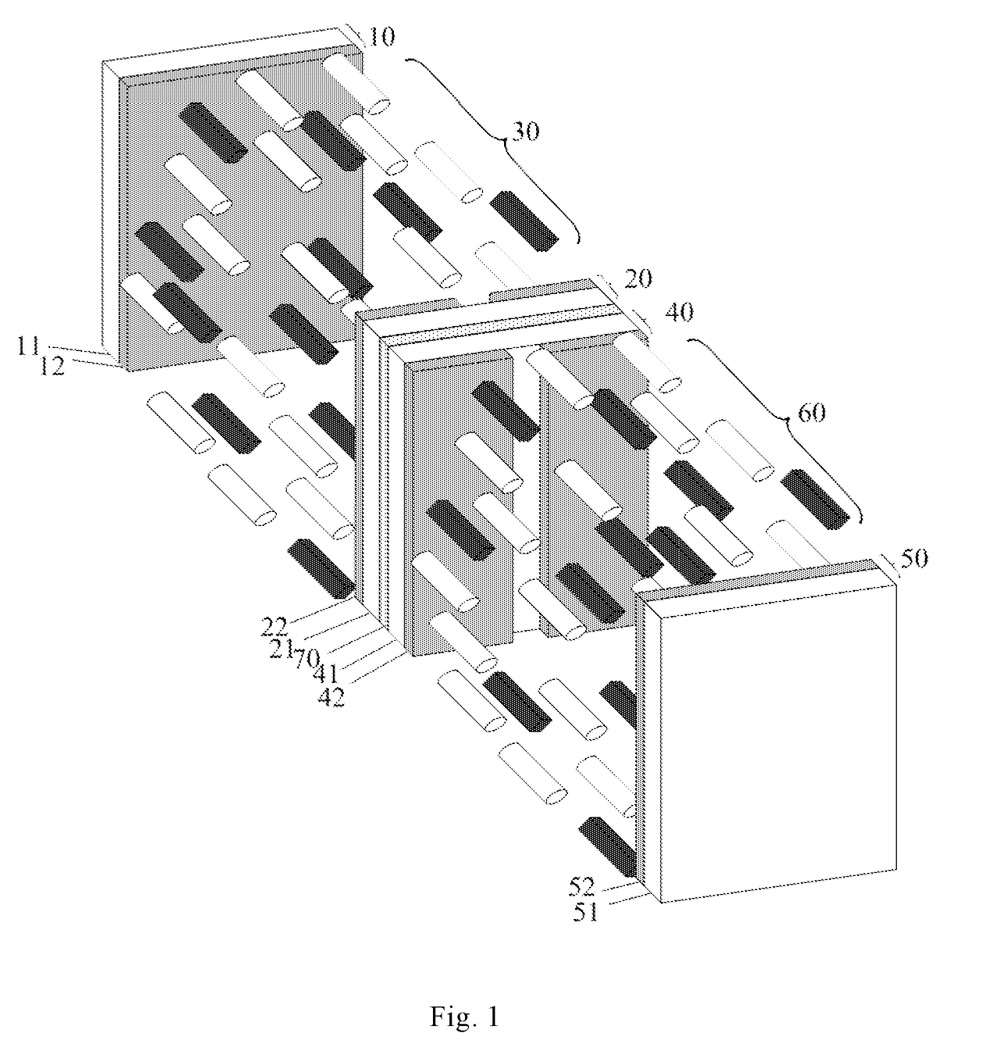
FIG. 1 is a schematic structural diagram of a first case of a light adjusting glass provided by an embodiment of the present disclosure.
Figure 2:
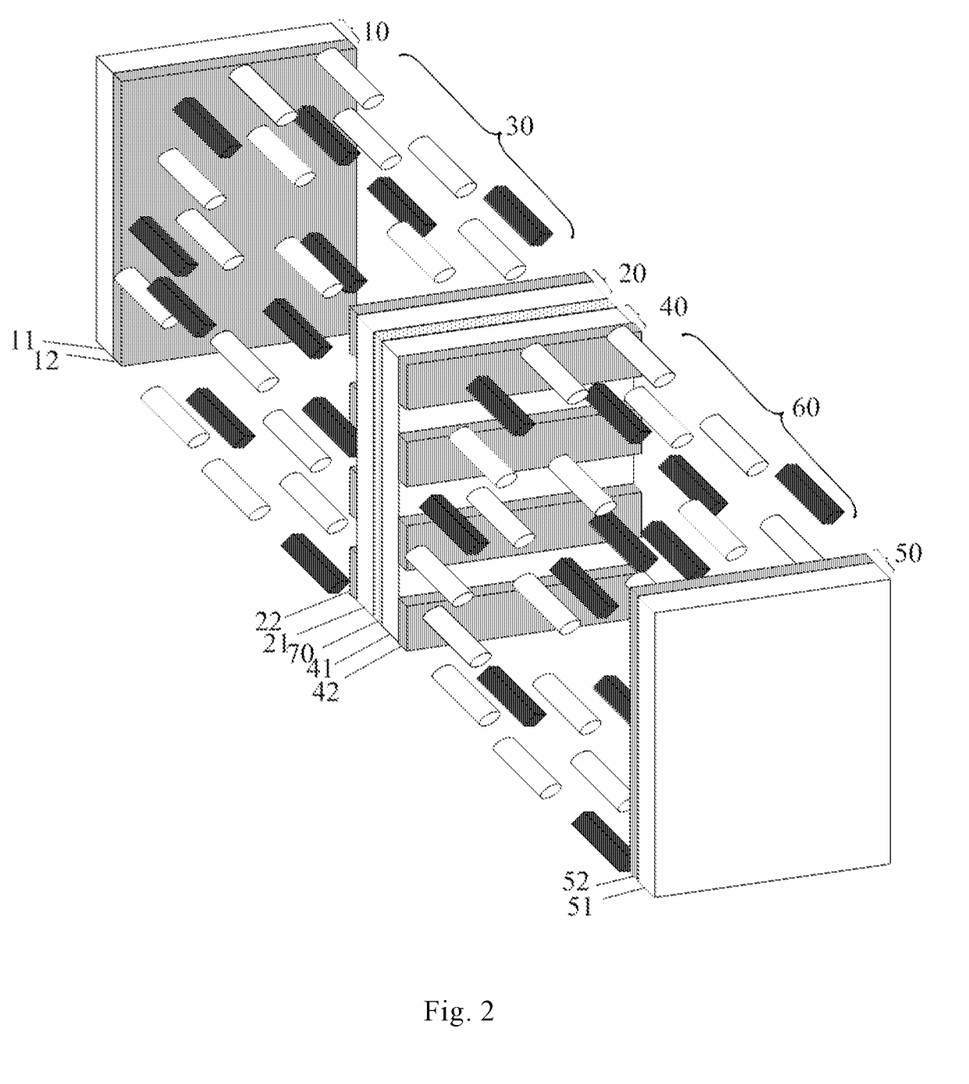
FIG. 2 is a schematic structural diagram of a second case of a light adjusting glass provided by an embodiment of the present disclosure.
Figure 3:
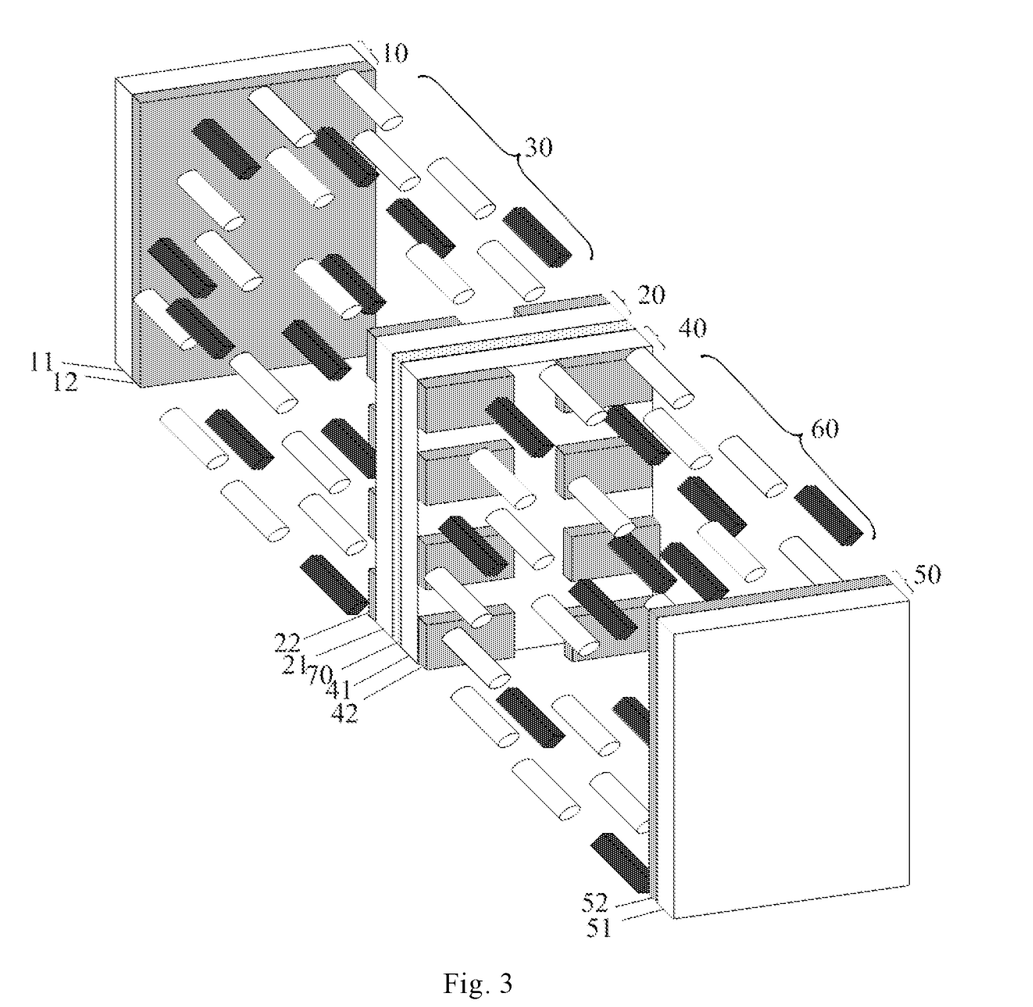
FIG. 3 is a schematic structural diagram of a third case of a light adjusting glass provided by an embodiment of the present disclosure.

Referring to FIGS. 1 to 3, an embodiment of the present disclosure provides a light adjusting glass including a plurality of liquid crystal cells which are disposed in a laminated mode; each liquid crystal cell includes two substrates and a liquid crystal layer interposed between the two substrates; where each of the substrates includes a base and an electrode layer on a side of the base proximal to the liquid crystal layer, at least one of two electrode layers in each liquid crystal cell includes a plurality of electrode blocks, and the electrode blocks are respectively controlled by separate driving circuits.

The following description will be given by taking an example in which the light adjusting glass includes two liquid crystal cells (a first liquid crystal cell and a second liquid crystal cell, respectively), and one electrode layer of the first liquid crystal cell includes a plurality of electrode blocks, and one electrode layer of the second liquid crystal cell includes a plurality of electrode blocks.

As a first case of the embodiment, the light adjusting glass is simply partitioned, as shown in FIG. 1, the first liquid crystal cell of the light adjusting glass includes a first substrate 10, a second substrate 20, and a first liquid crystal layer 30 disposed between the first substrate 10 and the second substrate 20, the first substrate 10 includes a first base 11, a first electrode layer 12 disposed on a side of the first base 11 proximal to the first liquid crystal layer 30; the second substrate 20 includes a second base 21 disposed opposite to the first base 11, a second electrode layer 22 disposed on a side of the second base 21 proximal to the first liquid crystal layer 30; the first electrode layer 12 of the first liquid crystal cell is a plate-shaped electrode, the second electrode layer 22 includes a plurality of electrode blocks disposed side by side along a row direction, and specifically, as shown in FIG. 1, the second electrode layer 22 includes two electrode blocks disposed on left and right; accordingly, the second liquid crystal cell includes a third substrate 40, a fourth substrate 50, and a second liquid crystal layer 60 disposed between the third substrate 40 and the fourth substrate 50, the third substrate 40 includes a third base 41, a third electrode layer 42 disposed on a side of the third base 41 proximal to the second liquid crystal layer 60; the fourth substrate 50 includes a fourth base 51 disposed opposite to the third base 41, a fourth electrode layer 52 disposed on a side of the fourth base 51 proximal to the second liquid crystal layer 60; the third electrode layer 42 of the second liquid crystal cell includes a plurality of electrode blocks disposed side by side along the row direction, specifically, as shown in FIG. 1, the third electrode layer 42 of the second liquid crystal cell includes two electrode blocks disposed on left and right; the fourth electrode layer 52 is a plate-shaped electrode. The two electrode blocks of the second electrode layer 22 in the first liquid crystal cell correspond to the two electrode blocks of the third electrode layer 42 in the second liquid crystal cell one by one, and the electrode blocks are respectively controlled by separate driving circuits; the second base 21 of the first liquid crystal cell and the third base 41 of the second liquid crystal cell are bonded together by an adhesive layer 70. If the light adjusting glass is applied to a vehicle window, a passenger corresponding to a left side of the light adjusting glass can adjust the light transmittance of the area at the left side of the light adjusting glass by adjusting a voltage applied on the electrode block at the left side, so as to meet requirements of the passenger at the left side; correspondingly, a passenger on a right side of the corresponding light adjusting glass can adjust the light transmittance of the area at the right side of the light adjusting glass by adjusting a voltage applied on the electrode block at the right side, so as to meet requirements of the passenger at the right side.

Certainly, the electrode blocks in the second electrode layer 22 of the first liquid crystal cell may not be provided in one-to-one correspondence with the electrode blocks in the third electrode layer 41 of the second liquid crystal cell, and a correspondence between the electrode blocks in the second electrode layer 22 of the first liquid crystal cell and the electrode blocks in the third electrode layer 41 of the second liquid crystal cell may be adjusted according to application scenarios of the light adjusting glass.

As a second case of the embodiment, the light adjusting glass may have a single louver structure, and as shown in FIG. 2, the first liquid crystal cell of the light adjusting glass may include a first substrate 10, a second substrate 20, and a first liquid crystal layer 30 disposed between the first substrate 10 and the second substrate 20, the first substrate 10 includes a first base 11, a first electrode layer 12 disposed on a side of the first base 11 proximal to the first liquid crystal layer 30; the second substrate 20 includes a second base 21 disposed opposite to the first base 11, a second electrode layer 22 disposed on a side of the second base 21 proximal to the first liquid crystal layer 30; where the first electrode layer 12 of the first liquid crystal cell is a plate-shaped electrode, the second electrode layer 22 includes a plurality of electrode blocks disposed side by side along a column direction, and specifically, as shown in FIG. 2, the second electrode layer 22 includes a plurality of electrode blocks disposed in an up-and-down direction; accordingly, the second liquid crystal cell may include a third substrate 40, a fourth substrate 50, and a second liquid crystal layer 60 disposed between the third substrate 40 and the fourth substrate 50, the third substrate 40 includes a third base 41, a third electrode layer 42 disposed on a side of the third base 41 proximal to the second liquid crystal layer 60; the fourth substrate 50 includes a fourth base 51 disposed opposite to the third base 41, a fourth electrode layer 52 disposed on a side of the fourth base 51 proximal to the second liquid crystal layer 60; the third electrode layer 42 of the second liquid crystal cell includes a plurality of electrode blocks disposed side by side along the column direction, and specifically, as shown in FIG. 2, the third electrode layer 42 of the second liquid crystal cell includes a plurality of electrode blocks disposed in the up-and-down direction; the fourth electrode layer 52 is a plate-shaped electrode. The electrode blocks of the second electrode layer 22 of the first liquid crystal correspond to the electrode blocks of the third electrode layer 42 of the second liquid crystal cell one by one, and the electrode blocks are respectively controlled by separate driving circuits; the second base 21 of the first liquid crystal cell and the third base 41 of the second liquid crystal cell are bonded together by an adhesive layer 70. In such way, the respective driving circuits can apply corresponding voltage signals to the corresponding electrode blocks respectively, so that the light transmittances of the light adjusting glass at positions corresponding to different electrode blocks are different, that is, the light transmittances of the light adjusting glass in respective areas along the up-and-down direction are different, similar to a louver. It should be noted that, a gray scale of an area of the first liquid crystal cell corresponding to each electrode block is adjustable, that is, the light transmittance of the area of the first liquid crystal cell corresponding to each electrode block is adjustable, and a gray scale of an area of the second liquid crystal cell corresponding to each electrode block is also adjustable, that is, the light transmittance of the area of the second liquid crystal cell corresponding to each electrode block is also adjustable.

Certainly, the electrode blocks in the second electrode layer of the first liquid crystal cell may not be disposed in one-to-one correspondence with the electrode blocks in the third electrode layer of the second liquid crystal cell, and a correspondence between the electrode blocks in the second electrode layer of the first liquid crystal cell and the electrode blocks in the third electrode layer of the second liquid crystal cell may be adjusted according to application scenarios of the light adjusting glass.

As a third case of the embodiment, the light adjusting glass may have a plurality of louver structures, the first liquid crystal cell in the light adjusting glass may include a first substrate 10, a second substrate 20, and a first liquid crystal layer 30 disposed between the first substrate 10 and the second substrate 20, the first substrate 10 may include a first base 11, a first electrode layer 12 disposed on a side of the first base 11 proximal to the first liquid crystal layer 30; the second substrate 20 may include a second base 21 disposed opposite to the first base 11, a second electrode layer 22 disposed on a side of the second base 21 proximal to the first liquid crystal layer 30; the first electrode layer 12 of the first liquid crystal cell may be a plate-shaped electrode, the second electrode layer 22 may include a plurality of electrode blocks disposed in an array, and specifically, as shown in FIG. 3, the second electrode layer 22 includes a plurality of electrode blocks disposed in an array; accordingly, the second liquid crystal cell may include a third substrate 40, a fourth substrate 50, and a second liquid crystal layer 60 disposed between the third substrate 40 and the fourth substrate 50, the third substrate 40 includes a third base 41, a third electrode layer 42 disposed on a side of the third base 41 proximal to the second liquid crystal layer 60; the second substrate 50 includes a fourth base 51 disposed opposite to the third base 41, a fourth electrode layer 52 disposed on a side of the fourth base 51 proximal to the second liquid crystal layer 60; the third electrode layer 42 of the second liquid crystal cell includes a plurality of electrode blocks disposed in an array, specifically, as shown in FIG. 3, the third electrode layer 42 of the second liquid crystal cell includes a plurality of electrode blocks disposed in an array; the fourth electrode layer 52 is a plate-shaped electrode. The electrode blocks of the second electrode layer 22 of the first liquid crystal cell correspond to the electrode blocks of the third electrode layer 42 of the second liquid crystal cell one by one, and the electrode blocks are respectively controlled by separate driving circuits; the second base 21 of the first liquid crystal cell and the third base 41 of the second liquid crystal cell are bonded together by an adhesive layer 70. In such way, the driving circuits can apply corresponding voltage signals to the electrode blocks to control voltages on the electrode blocks in a same column to be different, so that the light transmittances of the light adjusting glass at positions corresponding to different electrode blocks in a column are different, that is, an area of the light adjusting glass corresponding to a column of electrode blocks is similar to a louver, and areas of the light adjusting glass corresponding to multiple columns of electrode blocks are similar to multiple louvers; in practical applications, the light transmittances of the areas of the light adjusting glass similar to the louvers may be the same or different. It should be noted that, a gray scale of an area of the first liquid crystal cell corresponding to each electrode block is adjustable, that is, the light transmittance of the area of the first liquid crystal cell corresponding to each electrode block is adjustable, and a gray scale of an area of the second liquid crystal cell corresponding to each electrode block is also adjustable, that is, the light transmittance of the area of the second liquid crystal cell corresponding to each electrode block is also adjustable.

Certainly, the electrode blocks in the second electrode layer of the first liquid crystal cell may not be disposed in one-to-one correspondence with the electrode blocks in the third electrode layer of the second liquid crystal cell, and a correspondence between the electrode blocks in the second electrode layer of the first liquid crystal cell and the electrode blocks in the third electrode layer of the second liquid crystal cell may be adjusted according to application scenarios of the light adjusting glass.

It should be noted that, only a few specific implementation structures of the light adjusting glass are given above. In fact, as long as an electrode layer of a liquid crystal cell includes a plurality of electrode blocks, and the electrode blocks are respectively controlled by separate driving circuits, different areas of the light adjusting glass with different light transmittances can be realized. Certainly, when each of two electrode layers in each liquid crystal cell includes a plurality of electrode blocks and the electrode blocks are respectively controlled by separate driving circuits, different areas of the light adjusting glass with different light transmittances can also be achieved. Working principles of various implementation structures are the same, and therefore are not described in detail herein.

Certainly, whichever of the above-mentioned light adjusting glasses may further include a first alignment layer disposed on a side of the first electrode layer of the first liquid crystal cell proximal to the first liquid crystal layer, a second alignment layer disposed on a side of the second electrode layer of the first liquid crystal cell proximal to the first liquid crystal layer, a third alignment layer disposed on a side of the third electrode layer of the second liquid crystal cell proximal to the second liquid crystal layer, and a fourth alignment layer disposed on a side of the fourth electrode layer of the second liquid crystal cell proximal to the second liquid crystal layer; where pretilt angles of liquid crystal molecules in the first liquid crystal layer with respect to the first alignment layer and the second alignment layer are the same, pretilt angles of liquid crystal molecules in the second liquid crystal layer with respect to the third alignment layer and the fourth alignment layer are the same, and are different from the pretilt angles of the liquid crystal molecules in the first liquid crystal layer with respect to the first alignment layer and the second alignment layer by 90°. Thus, when no voltage is applied, the liquid crystal molecules in the first liquid crystal cell and the liquid crystal molecules in the second liquid crystal cell are superposed orthogonally, directions of light absorbed by the liquid crystal molecules in the two liquid crystal cells are orthogonal to each other, and according to the Malus law, incident light is absorbed almost completely, and the light adjusting glass is in a dark state.

Correspondingly, an embodiment of the present disclosure further provides a method for manufacturing a light adjusting glass, and the light adjusting glass includes two liquid crystal cells, i.e., a first liquid crystal cell and a second liquid crystal cell; a second electrode layer in the first liquid crystal cell includes a plurality of electrode blocks, and a third electrode layer in the second liquid crystal cell includes a plurality of electrode blocks. The method may specifically include steps of manufacturing the first liquid crystal cell, manufacturing the second liquid crystal cell, and bonding the first liquid crystal cell with the second liquid crystal cell.

The step of manufacturing the first liquid crystal cell may specifically include the following steps S11 to S13.

S11, forming a plate-shaped first electrode layer on a first base; forming a second electrode layer on a second base; where the second electrode layer includes a plurality of electrode blocks.

S12, coating PI (polyimide) liquid and performing a rubbing process on the first electrode layer and the second electrode layer to form a first alignment layer and a second alignment layer.

S13, coating frame sealing adhesive on one of the first alignment layer and the second alignment layer, mixing liquid crystal molecules with dichroic dye molecules to form black dye liquid crystal, and dropping the black dye liquid crystal on the other of the first alignment layer and the second alignment layer; and then, aligning and assembling the first base and the second base to form the first liquid crystal cell.

The step of manufacturing the second liquid crystal cell may specifically include the following steps S21 to S23.

S21, forming a third electrode layer on a third base, where the third electrode layer includes a plurality of electrode blocks; and forming a plate-shaped fourth electrode layer on a fourth substrate.

S22, coating PI liquid and performing a rubbing process on the third electrode layer and the fourth electrode layer to form a third alignment layer and a fourth alignment layer.

S23, coating frame sealing adhesive on one of the third alignment layer and the fourth alignment layer, mixing liquid crystal molecules with dichroic dye molecules to form black dye liquid crystal, and dropping the black dye liquid crystal on the other of the third alignment layer and the fourth alignment layer; and then aligning and assembling the third base and the fourth base to form the second liquid crystal cell.

The step of bonding the first liquid crystal cell with the second liquid crystal cell includes: bonding the second base of the first liquid crystal cell and the third base of the second liquid crystal cell together through an adhesive layer to form the light adjusting glass.

Figure 4:
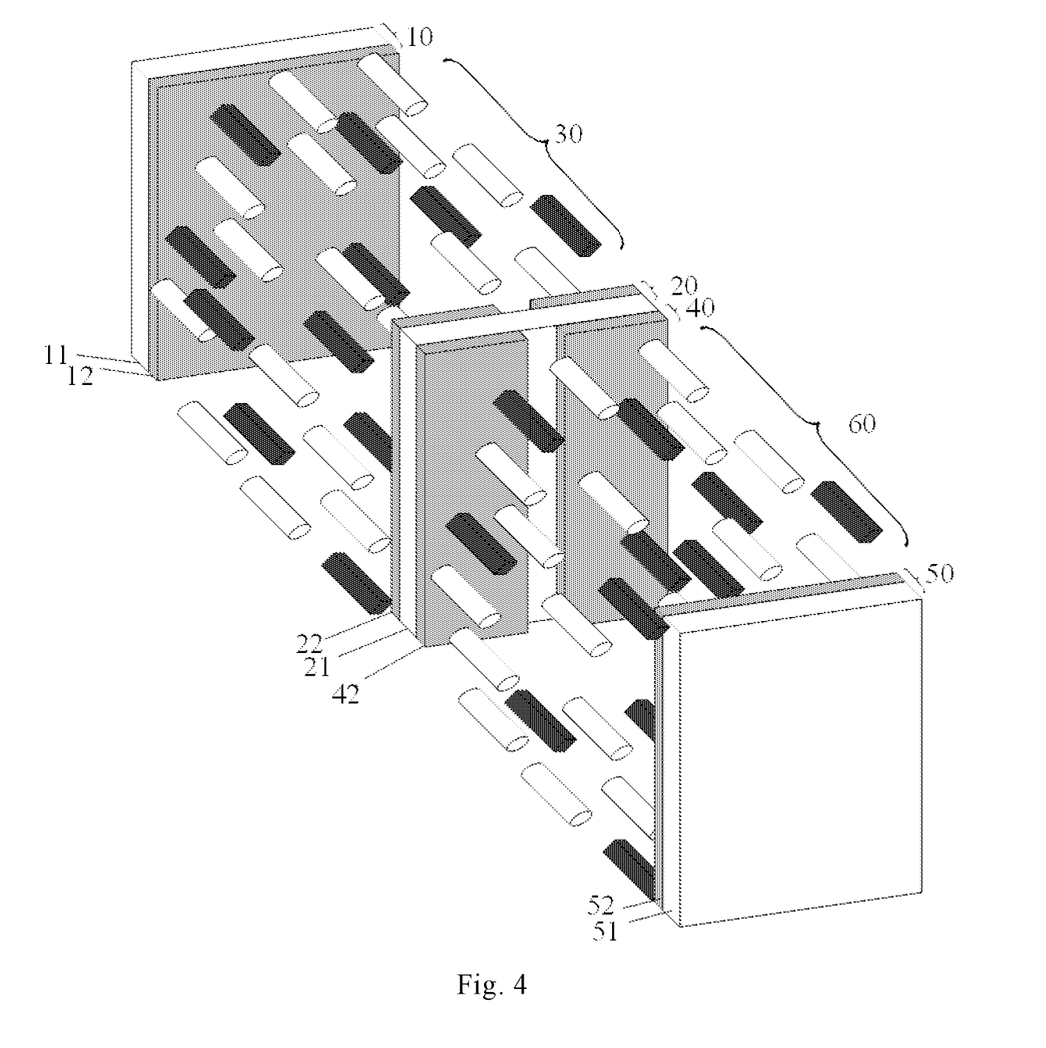
FIG. 4 is a schematic structural diagram of a light adjusting glass provided by an embodiment of the present disclosure.

As shown in FIG. 4, an embodiment of the present disclosure further provides a light adjusting glass, which has substantially the same structure as that of the above embodiment, except that, in the light adjusting glass of the present embodiment, a base of one liquid crystal cell of any two adjacent liquid crystal cells is common to a base of the other liquid crystal cell. Similarly, the example that the light adjusting glass includes two liquid crystal cells, i.e., the first liquid crystal cell and the second liquid crystal cell is taken. In the present embodiment, the first liquid crystal cell and the second liquid crystal cell require three bases (e.g., transparent bases). As shown in FIG. 4, the second base 21 in the first liquid crystal cell simultaneously serves as the third base 41 of the second liquid crystal cell. It can be seen that, compared to the light adjusting glass in the above embodiment, the light adjusting glass in the present embodiment omits a base (e.g., the third base 41 of the second liquid crystal cell) and the adhesive layer 70 bonding the second base 21 of the first liquid crystal cell to the first base 41 of the second liquid crystal cell, and therefore, a thickness of the light adjusting glass can be reduced, and the cost can be reduced.

For the remaining structures of the light adjusting glass in the present embodiment, the same structures in the above embodiment may be adopted, and therefore details are not repeated in the present embodiment.

It should be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the present disclosure, and these changes and modifications are to be considered within the scope of the present disclosure.

The invention claimed is:

1. A light adjusting glass, comprising a first liquid crystal cell and a second liquid crystal cell, wherein
the first liquid crystal cell comprises a first substrate and a second substrate which are disposed opposite to each other, and a first liquid crystal layer interposed between the first substrate and the second substrate, the second liquid crystal cell comprises a third substrate and a fourth substrate which are disposed opposite to each other, and a second liquid crystal layer interposed between the third substrate and the fourth substrate, and the second substrate of the first liquid crystal cell and the third substrate of the second liquid crystal cell are disposed in a laminated mode,
the first substrate of the first liquid crystal cell comprises a first base, a first electrode layer disposed on a side of the first base proximal to the first liquid crystal layer, the second substrate of the first liquid crystal cell comprises a second base, a second electrode layer disposed on a side of the second base proximal to the first liquid crystal layer, the second electrode layer comprises a plurality of electrode blocks which are disposed at intervals;
the third substrate of the second liquid crystal cell comprises a third base, a third electrode layer disposed on a side of the third base proximal to the second liquid crystal layer, the fourth substrate of the second liquid crystal cell comprises a fourth base, a fourth electrode layer disposed on a side of the fourth base proximal to the second liquid crystal layer, the third electrode layer comprises a plurality of electrode blocks which are disposed at intervals, and wherein,
the electrode blocks of the second electrode layer in the first liquid crystal cell correspond to the electrode blocks of the third electrode layer in the second liquid crystal cell one by one, and the electrode blocks are respectively controlled by separate driving circuits.

2. The light adjusting glass of claim 1, wherein the first substrate of the first liquid crystal cell further comprises a first alignment layer disposed on a side of the first electrode layer proximal to the first liquid crystal layer, and the second substrate of the first liquid crystal cell further comprises a second alignment layer disposed on a side of the second electrode layer proximal to the first liquid crystal layer; wherein pretilt angles of liquid crystal molecules in the first liquid crystal layer with respect to the first alignment layer and the second alignment layer are the same;
the third substrate of the second liquid crystal cell further comprises a third alignment layer disposed on a side of the third electrode layer proximal to the second liquid crystal layer, and the fourth substrate of the second liquid crystal cell further comprises a fourth alignment layer disposed on a side of the fourth electrode layer proximal to the second liquid crystal layer; wherein pretilt angles of liquid crystal molecules in the second liquid crystal layer with respect to the third alignment layer and the fourth alignment layer are the same, and are different from the pretilt angles of the liquid crystal molecules in the first liquid crystal layer with respect to the first alignment layer and the second alignment layer by 90°.

3. The light adjusting glass of claim 1, wherein the first electrode layer is a plate-shaped electrode, and the fourth electrode layer is a plate-shaped electrode.

4. The light adjusting glass of claim 1, wherein the electrode blocks of each of the second electrode layer and the third electrode layer are disposed in an array.

5. The light adjusting glass of claim 1, wherein the electrode blocks of each of the second electrode layer and the third electrode layer are disposed side by side in a row direction or in a column direction.

6. The light adjusting glass of claim 1, wherein each of the first liquid crystal layer and the second liquid crystal layer comprises dye liquid crystal molecules.

7. The light adjusting glass of claim 1, wherein each of the first liquid crystal layer and the second liquid crystal layer is doped with chiral additive.

8. The light adjusting glass of claim 1, wherein the second base of the first liquid crystal cell is common to the third base of the second liquid crystal cell.

* * * * *